US008229034B2

(12) United States Patent
Gierl et al.

(10) Patent No.: US 8,229,034 B2
(45) Date of Patent: Jul. 24, 2012

(54) FM RADIO RECEIVER PROCESSING SYSTEM

(75) Inventors: Stefan Gierl, Karlsruhe (DE); Christoph Benz, Ohlsbach (DE); Dieter Jurzizta, Karlsruhe (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 1479 days.

(21) Appl. No.: 11/071,017

(22) Filed: Mar. 3, 2005

(65) Prior Publication Data
US 2005/0195920 A1 Sep. 8, 2005

(30) Foreign Application Priority Data

Mar. 4, 2004 (EP) ..................................... 04005164

(51) Int. Cl.
*H03D 3/00* (2006.01)
(52) U.S. Cl. ....................................... 375/322; 375/316
(58) Field of Classification Search .................... 375/322
See application file for complete search history.

(56) References Cited

U.S. PATENT DOCUMENTS

| 4,684,980 | A | * | 8/1987 | Rast et al. ..................... 725/120 |
|---|---|---|---|---|
| 4,710,956 | A | * | 12/1987 | Rast ................................. 725/25 |
| 4,816,769 | A | * | 3/1989 | Ma et al. ......................... 329/315 |
| 5,257,312 | A | * | 10/1993 | Therssen et al. .................. 381/4 |
| 5,448,299 | A | * | 9/1995 | Yang et al. ..................... 375/329 |
| 5,459,432 | A |   | 10/1995 | White et al. .................. 329/307 |
| 5,479,449 | A | * | 12/1995 | Patel et al. ..................... 375/316 |
| 5,517,529 | A | * | 5/1996 | Stehlik .......................... 375/316 |
| 5,636,252 | A | * | 6/1997 | Patel et al. ..................... 375/345 |
| 5,673,324 | A | * | 9/1997 | Kasser et al. ...................... 381/4 |
| 6,052,569 | A |   | 4/2000 | Ehrhardt ..................... 455/188.1 |
| 6,111,613 | A | * | 8/2000 | Sasano et al. ................. 348/468 |
| 2004/0132418 | A1 | * | 7/2004 | Wildhagen ................... 455/130 |
| 2005/0083996 | A1 | * | 4/2005 | Robinson et al. ............. 375/131 |
| 2005/0144648 | A1 | * | 6/2005 | Gotwals et al. ............... 725/111 |

FOREIGN PATENT DOCUMENTS

| EP | 0200977 | 4/1986 |
|---|---|---|
| EP | 0 200 977 A | 11/1986 |
| EP | 1241814 | 3/2001 |
| EP | 1 241 814 A | 9/2002 |

* cited by examiner

*Primary Examiner* — Shuwang Liu
*Assistant Examiner* — Michael Neff
(74) *Attorney, Agent, or Firm* — The Eclipse Group LLP

(57) ABSTRACT

A processing front-end for FM radio signals includes a receiver, a filter, and a mixer. The receiver obtains an FM radio signal including data content centered at a data frequency and programming content. The filter is coupled to the receiver and removes the programming content from the FM radio signal. The mixer accepts the filtered FM radio signal and shifts the center frequency of the data content to a lower frequency than the first frequency. The lower frequency is selected according to a sampling rate available in an analog-to-digital converter present in a subsequent processing stage, typically a low cost digital signal processor.

22 Claims, 4 Drawing Sheets

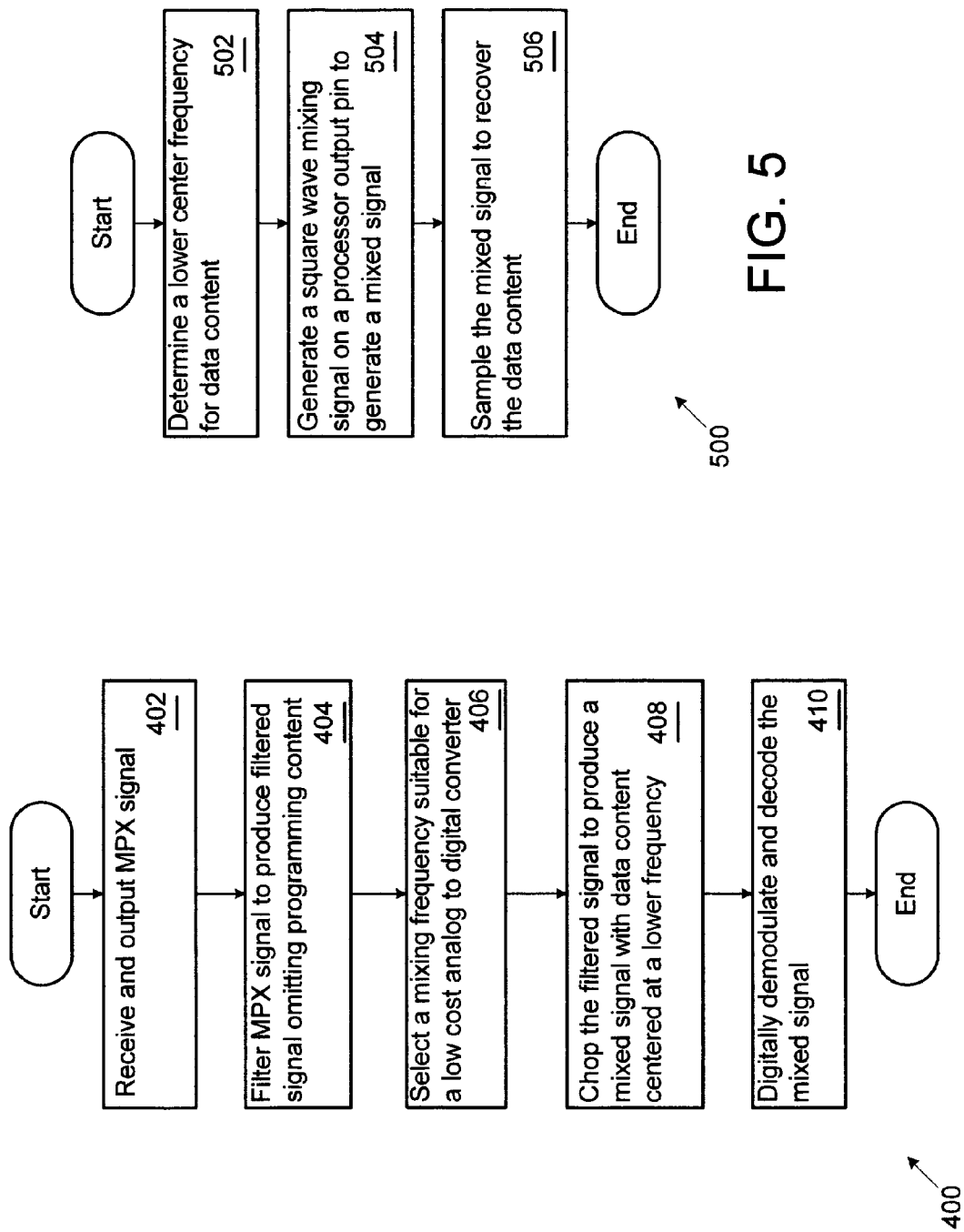

FM RADIO RECEIVER PROCESSING SYSTEM

This application claims priority to European Patent Application Serial No. 04005164.1 filed on Mar. 4, 2004, which is incorporated into this application by Reference in its entirety.

BACKGROUND OF THE INVENTION

1. Field of the Invention

This invention relates generally to FM radio receivers. In particular, this invention relates to a front-end for processing a multiplex FM radio signal such that data content in the multiplex signal may be recovered inexpensively and without undue complexity.

2. Related Art

Modern FM radio transmissions include several types of content. In most cases, the FM radio signal for a particular channel is a multiplex signal that includes not only left and right channel audio content, but also data content. The data content typically takes one of two forms; either Radio Data System (RDS) data content (commonly used in North America), or Autofahrer Rundfunk Information (ARI) data content (commonly used in Europe).

Radio stations insert many different types of information into the data content. As examples, the data content may carry program identification codes that indicate the name of the audio program provided in the program content, the name of the radio station broadcasting the FM radio signal, news, advertising, traffic reports, alternative reception frequencies for the audio program, and so on. Processing circuitry in the radio decodes the data content and outputs the corresponding information on a display.

In the past, receiving and processing the data content has met with several disadvantages, summarized below with reference to FIG. 1. In particular, prior radios included a receiver that output the multiplex FM radio signal to a highly specialized analog RDS demodulator. The analog RDS demodulator included circuitry for recovering, from the FM radio signal, digital RDS data that the demodulator provided to a subsequent processing stage using a data output and a clock output.

However, the analog RDS demodulators were complex devices with a relatively high price tag. In part, their expense derived not only from their specialized nature, but also from their tendency to include a great deal of additional processing circuitry for other purposes. Thus, for example, some RDS demodulators also included signal quality estimators, digital communication interfaces, and the like. As a result, FM radios were subject to undue increases in cost and design complexity when they included RDS information features.

Increasing the cost of the radio is, of course, undesirable from many standpoints, including design and manufacturing as well as consumer purchasing. Therefore, there is a need for methods and systems for processing the data content that do not suffer from the shortcomings set forth above, or others previously experienced.

SUMMARY

This invention provides a front-end processing system for FM radio signals. The front-end processing system typically includes a receiver, a filter, and a mixer. The receiver obtains an FM radio signal that includes both data content and programming content. The filter is coupled to the receiver and removes the programming content from the FM radio signal. The mixer accepts the filtered FM radio signal and shifts the center frequency of the data content to a lower frequency. The lower frequency is generally selected according to a sampling rate available in an analog-to-digital converter present in a subsequent processing stage, for example, in a low cost digital signal processor.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The components in the figures are not necessarily to scale, emphasis instead being placed upon illustrating the principles of the invention. In the figures, like reference numerals designate corresponding parts throughout the different views.

FIG. 4 is a flow chart illustrating a method for processing an FM radio signal to make the data content recoverable without undue cost or complexity.

FIG. 5 is a flow chart illustrating the steps taken by an FM signal processing system program run by the processor in the FM radio shown in FIG. 2.

DETAILED DESCRIPTION

Figure 1:
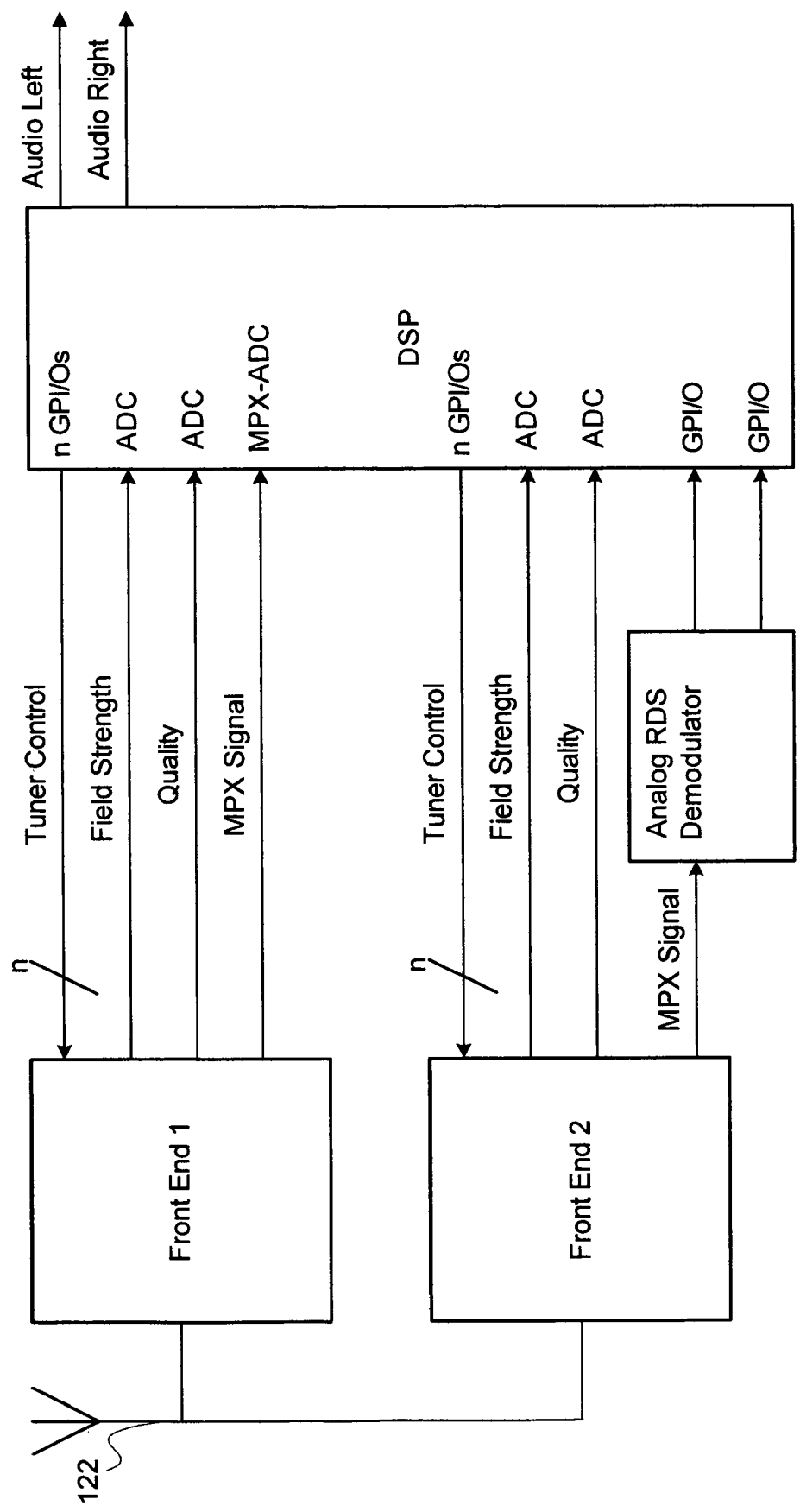
FIG. 1 is a block diagram illustrating a prior art FM radio incorporating an analog RDS demodulator.
Figure 2:
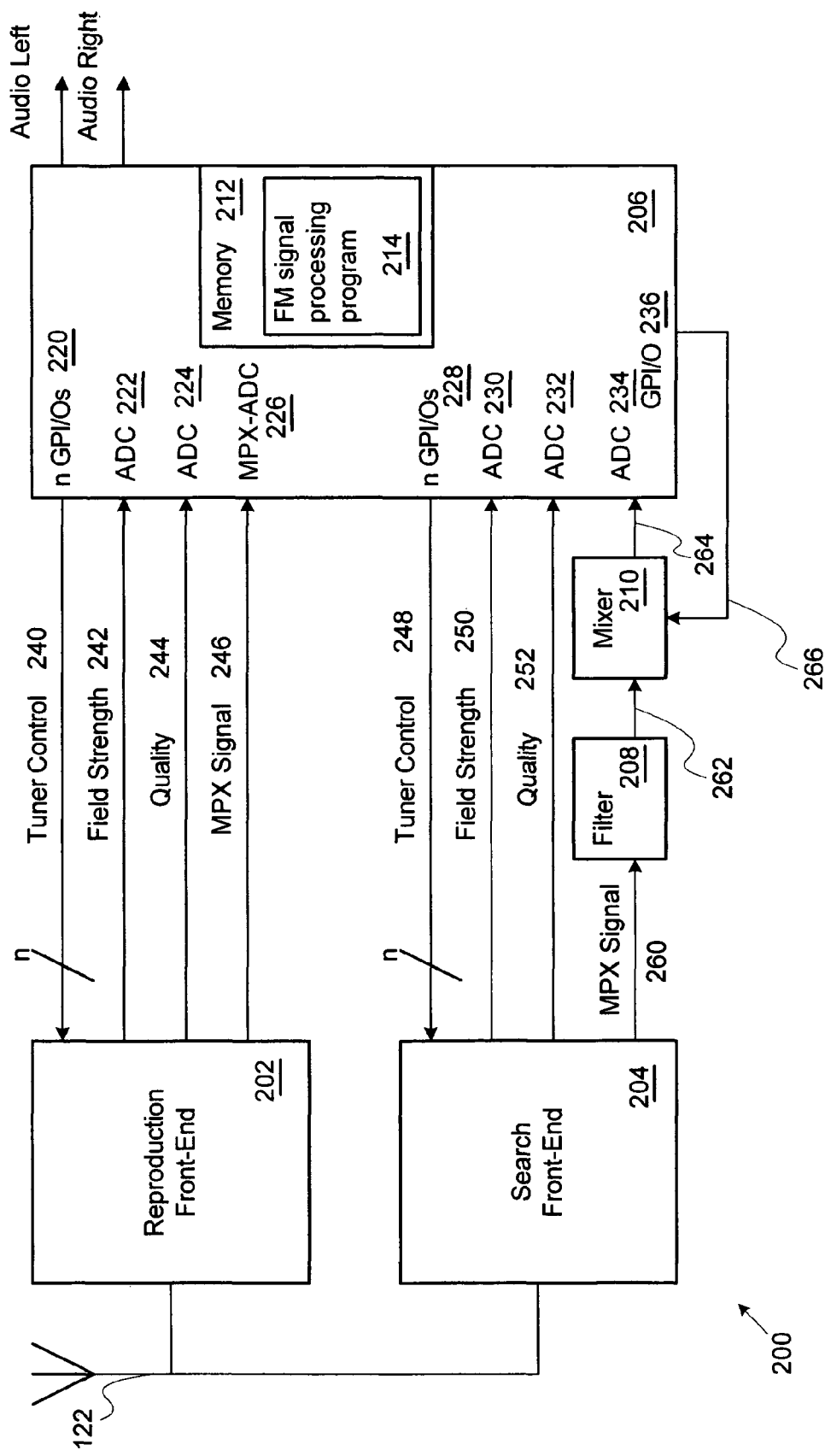
FIG. 2 is a block diagram illustrating an FM radio incorporating a signal processing front-end for helping to recover data content in the FM radio signal without undue cost or complexity.

FIG. 2 illustrates an FM radio 200 that includes a reproduction front-end 202, a search front-end 204, and a processor 206. A filter 208 and a mixer 210 are connected to the search front-end 204 and where the processor 206 executes a program by calling from memory 212 an FM signal-processing program 214 capable of coordinating the reception of data content in an FM radio signal 122.

Although the memory 212 is depicted in FIG. 2 as EEPROM onboard the processor 206, one skilled in the art will appreciate that a variety of memory storage areas may be used, including but not limited to, off-chip memory systems and their derivatives, and other types of on-chip memory storage devices including their derivatives.

The front-ends 202, 204 generally act as receivers that include signal quality estimators as well as mixers and filters that separate out individual FM radio channels for processing by the processor 206. The processor 206 may be implemented as a general purpose microprocessor, digital signal processor ("DSP"), microcontroller, application specific integrated circuit ("ASIC"), reduced instruction set computer core ("RISC"), custom integrated circuit, Field Programmable Gate Array ("FPGA"), or their derivative successors. The processor 206 coordinates signal reception by the front-ends 202, 204 by employing the general-purpose input/output ("GPI/O") pins 220, 228, 236, and also includes one or more on-board analog-to-digital converters ("ADCs") 222, 224, 226, 230, 232, 234 for digitizing analog input signals. For example, the processor 206 may include one or more fast ADCs that support a sampling rate of 176.4 KHz, and one or more ADCs that support a sampling rate of 44.1 KHz. As noted below, the ADCs may be delta-sigma ADCs that incorporate anti-aliasing filters.

In FIG. 2, the processor 206 coordinates signal reception by outputting tuner control signals 240, 248 that cause the front-ends 202, 204 to tune to a selected frequency. In response, the front-ends 202, 204 extract the FM radio signal indicated by the processor 206, and provide field strength indicators 242, 250 and quality indicators 244, 252 back to the processor 206. The processor 206 may employ the indicators 242, 244, 250, 252 to determine when the reproduction front-end 202 should change frequency to begin reception of an FM channel with better signal quality. The search front-end 204 generally scans the FM spectrum in order to appraise the processor 206 of the signal quality available at different frequencies.

Note that the FM radio signal 122 is generally a multiplexed FM radio signal ("MPX signal"). The multiplexed signal includes both programming content and data content. As one example, the multiplexed signal may have the spectrum shown in FIG. 3 as the MPX signal 302. As shown, left (L) and right (R) audio content may be present in the MPX signal. More specifically, the programming content may include a summed L+R signal 312 extending from 20 Hz to 15 KHz, a pilot tone 314 at approximately 19 KHz, a lower sideband of an L-R signal 316 extending from 23 KHz to 38 KHz, and an upper sideband of the L-R signal 318 extending from 38 KHz to 53 KHz. The data content may include, as examples, an RDS or ARI signal 320 centered on a 57 KHz subcarrier.

More generally, programming content and data content are the information contained in two distinct spectral areas in a single FM radio channel. Information of any sort may be stored in the programming content and the data content. Thus, the programming content need not be audio information, and the data content need not be digital data.

Also in FIG. 2, the search front-end 204 couples its MPX signal 260 to the filter 208. The filter 208 may be, as an example, a high pass filter with a stop band below 33 KHz, a transition band between 33 and 55 KHz, and a pass band above 55 KHz. In another implementation, the filter 208 may be a bandpass filter with a passband between 55 and 59 KHz. Thus, the filter 208 removes the program content from the MPX signal 260. The data content remains as the filtered signal present on the filtered output 262. The high pass filter may be implemented with a resistor-capacitor (RC) structure or other filter structure known in the art, while the bandpass filter may be implemented, for example, using a second order filter such as an active filter based on an operational amplifier, with a high Q value (e.g., approximately 10). The filters are not limited to the implementations noted above. Rather, many implementation variations of the filters are also suitable.

The mixer 210 may be connected to the filtered output 262. The mixer 210 may be capable of shifting the frequency of the data content to a lower frequency than the original data content center frequency. Thus, for example, the mixer 210 may shift the RDS data content from a center frequency of approximately 57 KHz to a center frequency of 12.9 KHz. This provides the resultant mixed signal on the frequency shifted signal output 264.

The lower frequency may be selected according to the sampling rate(s) available to an ADC coupled to or on-board the processor 206. That is, the lower frequency may be chosen to spectrally place the data content at a bandwidth that a sampling rate available to a low-cost ADC allows the ADC to sample without significant aliasing or distortion.

The mixer 210 may also be implemented as a chopper circuit—a multiplier that forms the product of the filtered signal on the filtered output 262 and a chopping signal (e.g., a square wave or other on/off) signal. The chopping signal frequency may be selected to shift the data content to a lower frequency that is suitable for digitization by an ADC coupled to or on-board the processor 206. In one implementation, the processor 206 selects the chopping signal frequency using the frequency control input 266. That is, the processor 206 generates the chopping signal on the frequency control input 266 by driving a general-purpose output pin between an a high (or signal-1) state and a low (or signal-0) state. In other implementations, the chopping signal frequency may be fixed and pre-selected, or provided by a dedicated signal source.

The chopping signal frequency may be the same as the sampling frequency of the ADC that converts the mixed signal to digital form. To that end, the processor 206 may internally generate a sampling clock for the on-board ADC, and feed the sampling clock to the mixer 210 using a general purpose I/O pin. As one example, the ADC that converts the mixed signal may have a sampling rate of 44.1 KHz. As a result, the data content is shifted from 57 KHz down to 12.9 KHz. The ADC may be implemented as a delta-sigma ADC incorporating an anti-aliasing filter that removes any higher order mixing products. And, the MPX-ADC that converts the MPX signal from the reproduction front-end 202 may have a sampling rate of 176.4 KHz.

Although FIG. 2 illustrates the search front-end 204 coupled to the filter 208 and mixer 210, a filter and mixer may instead be provided on the reproduction front-end 202, or both the reproduction front-end 202 and search front-end 204.

Figure 3:
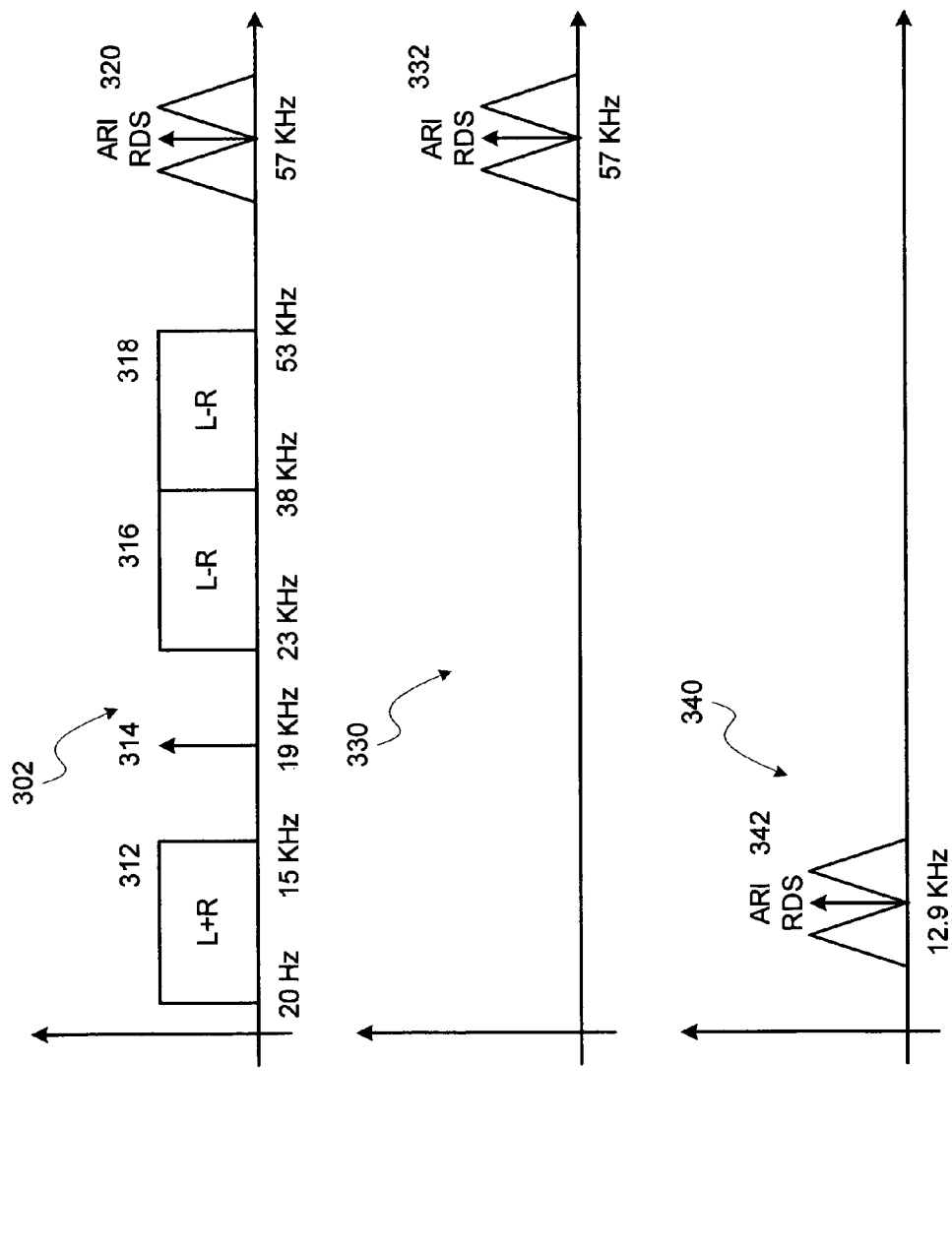
FIG. 3 is a spectrum diagram that illustrates the effect of the front-end shown in FIG. 2 on the received FM radio multiplex signal.

FIG. 3 shows spectrum diagrams 300 that illustrate the effect of the front-end system. In particular, FIG. 3 shows the MPX signal 302 that includes both programming content (L and R audio information) 312, 314, 316, 318 and data content (RDS / ARI data) 320. The filter 208 generates the filtered signal 330 on the filtered output 212. Note that the filtered output removes the programming content 312, 314, 316, 318 from the MPX signal. in addition, FIG. 3 shows the mixed signal 340 that the mixer 210 generates on the frequency shifted signal output 214. Note that the mixed signal 340 still includes the data content, but that the data content 342 is shifted to a lower center frequency of 12.9 KHz.

FIG. 4 summarizes a method for processing an FM radio signal to make the data content recoverable without undue cost or complexity. First, in step 402, the FM radio 200, FIG. 2, receives and outputs an MPX signal for example, using the search front-end 204. Subsequently, in step 404, the filter 208 filters the MPX signal to produce a filtered signal that eliminates the programming content present in the MPX signal. So that the FM radio may employ integrated low cost ADCs, a mixing frequency is selected for shifting the data content in the filtered signal to a lower frequency in step 406. The FM radio 200 then mixes the filtered signal to produce a mixed signal in which the data content is centered at the lower frequency in step 408. The processor 206 may then digitally demodulate, decode, output, and otherwise process the digital data present in the data content in step 410.

FIG. 5 summarizes the steps taken by the FM signal-processing program 214 run by the processor 206 in the FM radio 200 shown in FIG. 2. In step 502, the processing program 214 causes the processor 206 to determine a lower center frequency for the data content so that the data content may be digitized by an A-to-D converter in the processor 206 (502). As examples, the processor 206 may recall a parameter from memory or receive an input that indicates the lower center frequency. The parameter may be direct, for example setting forth the new center frequency explicitly, or indirect, for example setting forth the new center frequency in terms of another quantity, such as a mixing clock frequency to generate.

Next, in step 504, the processing program 214 causes the processor 206 to generate a mixing signal according to the lower center frequency. As noted above, the mixing signal is generally a square wave driven on a processor output pin to a chopping circuit. The chopping circuit mixes the FM radio signal to produce a mixed signal including the data content shifted to the lower center frequency. The processing program 214 then uses the A-to-D converter in the processor 206 to sample the mixed signal to recover the data content in step 506.

Thus, the FM radio 200, FIG. 2, no longer needs a separate dedicated analog RDS decoder. Rather, the FM radio 200 may eliminate the cost and complexity of the analog decoder, by replacing it with a lower complexity, relatively inexpensive circuitry. Thus, a front-end system formed from the search front-end 204, the filter 208, and mixer 210 provides the processor 206 with a frequency shifted data content signal that the processor 206 may digitize and process itself. The processing may include digital demodulation, decoding, error checking, message and data recovery, and the like, according to RDS or ARI signal specifications. In addition, because the data content has been shifted down in frequency, the processor 206 may capture the data content using an ADC with a slower sampling rate (e.g., 44.1 KHz), resulting in cost and complexity savings over faster ADCs.

While various embodiments of the invention have been described, it will be apparent to those of ordinary skill in the art that many more embodiments and implementations are possible that are within the scope of this invention.

What is claimed is:

1. A frequency modulation (FM) radio signal processing front-end, comprising:
a receiver including a multiplex signal output for carrying a received FM radio signal including data content centered at a data frequency and programming content;
a filter coupled to the multiplex signal output, the filter including a filtered output for carrying a filtered signal based on the received signal without the programming content; and
a mixer coupled to the filtered output, the mixer including a frequency shifted signal output for carrying a mixed signal including the data content shifted to a lower frequency than the data frequency, the lower frequency corresponding to a sampling rate used by an analog-to-digital converter to convert the data content shifted signal from analog to digital to extract the data from the FM radio signal.

2. The FM radio signal processing front-end of claim 1, where the programming content includes FM audio content.

3. The FM radio signal processing front-end of claim 1, where the data content is radio data system (RDS) content.

4. The FM radio signal processing front-end of claim 1, where the data content is autofahrer rundfunk information (ARI) content.

5. The FM radio signal processing front-end of claim 1, where the mixer includes a chopper circuit.

6. The FM radio signal processing front-end of claim 5, where the chopper. circuit includes a frequency control input.

7. The FM radio signal processing front-end of claim 1, where the filter includes a high pass filter.

8. The FM radio signal processing front-end of claim 1, where the lower frequency is approximately 12.9 KHz.

9. A method for processing an frequency modulation(FM) radio signal, comprising:
receiving an FM radio signal that includes data content centered at a first data frequency and programming content;
filtering the FM radio signal to produce a filtered FM radio signal that omits the programming content; and
mixing the filtered FM radio signal to produce a mixed signal including the data content shifted to a lower frequency than the first data frequency, the lower frequency corresponding to a sampling rate used by an analog-to-digital converter to convert the data content shifted signal from analog to digital to extract the data from the FM radio signal.

10. The method of claim 9, where the step of receiving includes the step of receiving an FM radio signal including radio data system (RDS) content and programming content.

11. The method of claim 9, where the step of receiving includes the step of receiving an FM radio signal including autofahrer rundfunk information (ARI) content and programming content.

12. The method of claim 9, where the step of mixing includes the step of chopping the filtered FM radio signal.

13. The method of claim 12, where the step of chopping the filtered FM radio signal in accordance with a frequency selection provided on a frequency control input.

14. The method of claim 9, where the step of mixing includes the step of mixing the filtered FM radio signal, to produce the mixed signal with the data content shifted to approximately 12.9 KHz.

15. An frequency modulation (FM) radio, comprising:
a receiver including a multiplex signal output for carrying a received FM radio signal including data content centered at a data frequency and programming content;
a filter coupled to the multiplex signal output, the filter including a filtered output for carrying a filtered signal based on the received signal without the programming content;
a mixer coupled to the filtered output, the mixer including a frequency shifted signal output for carrying a mixed signal including the data content shifted to a lower frequency than the data frequency; and
a processor including a processor input pin coupled to the frequency shifted signal output, the processor further including an analog-to-digital converter coupled to the processor input pin for digitizing the mixed signal, and where the lower frequency is selected according to a sampling rate available to the analog-to-digital converter to convert the data content shifted signal from analog to digital to extract the data from the FM radio signal.

16. The FM radio of claim 15, further including a second receiver including a programming signal output coupled to the processor, the programming signal output carrying the programming content.

17. The FM radio of claim 15, where the data content is radio data system (RDS) content.

18. The FM radio of claim 15, where the data content is or autofahrer rundfunk information (ARI) content.

19. The FM radio of claim 15, where the mixer includes a chopper circuit.

20. The FM radio of claim, 19, where the processor further includes a frequency control output coupled to the chopper circuit.

21. The FM radio of claim 15, where the lower frequency is approximately 12.9 KHz.

22. The FM radio of claim 15, where the analog-to-digital converter includes an anti-aliasing filter.

* * * * *